(12) United States Patent
Johnson et al.

(10) Patent No.: US 9,611,108 B1
(45) Date of Patent: Apr. 4, 2017

(54) ANTI-OXIDATION BULK PRODUCT DISPENSING SYSTEM

(71) Applicant: Trade Fixtures, LLC, Little Rock, AR (US)

(72) Inventors: Scott Johnson, Little Rock, AR (US); John Clayton Odom, Benton, AR (US); Ronald Brundick, Roland, AR (US)

(73) Assignee: TRADE FIXTURES, LLC, Little Rock, AR (US)

( * ) Notice: Subject to any disclaimer, the term of this patent is extended or adjusted under 35 U.S.C. 154(b) by 28 days.

(21) Appl. No.: 14/805,581

(22) Filed: Jul. 22, 2015

Related U.S. Application Data

(60) Provisional application No. 62/027,309, filed on Jul. 22, 2014.

(51) Int. Cl.
  *A23F 5/10* (2006.01)
  *B65G 65/00* (2006.01)
  *B65G 65/32* (2006.01)
  *B65G 65/34* (2006.01)

(52) U.S. Cl.
  CPC ........... *B65G 65/005* (2013.01); *B65G 65/32* (2013.01); *B65G 65/34* (2013.01)

(58) Field of Classification Search
  CPC ....... A23F 5/105; B65G 65/005; B65G 65/32; B65G 65/34
  See application file for complete search history.

(56) References Cited

U.S. PATENT DOCUMENTS

| | | | | |
|---|---|---|---|---|
| 2,874,629 A | * | 2/1959 | Kahan | A47J 31/002 99/287 |
| 3,333,963 A | * | 8/1967 | Moon | A23F 5/105 426/486 |
| 3,506,446 A | * | 4/1970 | Champion | A23F 5/105 426/397 |

(Continued)

FOREIGN PATENT DOCUMENTS

GB    2128068    * 4/1984

OTHER PUBLICATIONS

Photo, "Community Coffee" bulk coffee display with nitrogen flush system in Louisiana store; Community Coffee Company is based in Baton Rouge, Louisiana; one page.

*Primary Examiner* — Frederick C Nicolas
*Assistant Examiner* — Bob Zadeh
(74) *Attorney, Agent, or Firm* — James E. Eley; Ronald J. Koch; Eley Law Firm Co., LPA

(57) ABSTRACT

An anti-oxidation bulk product dispensing system for oxidation-sensitive bulk product includes a gravity-feed bin, an oxygen displacement substance, a supply source, and a control valve. A reservoir of the gravity feed bin is filled through an inlet with oxidation-sensitive bulk product. The product is stored in the reservoir and selectively dispensed through an outlet of the bin. The bin inadvertently receives oxygenated ambient air while receiving and dispensing the product. The supply source is configured to selectively provide the oxygen displacement substance to the bin. The control valve is in communication with the supply source and the bin and is configured to selectively deliver the oxygen displacement substance to the bin. The oxygen displacement substance displaces the oxygenated ambient air in the bin, thereby lessening oxidation of the stored product.

1 Claim, 9 Drawing Sheets

(56) References Cited

U.S. PATENT DOCUMENTS

| | | | | |
|---|---|---|---|---|
| 3,619,975 A * | 11/1971 | Johnson | ................ | B65B 31/06 53/110 |
| 4,648,888 A * | 3/1987 | Rowland | ............... | A61M 16/10 95/130 |
| 7,178,697 B2 * | 2/2007 | Brundick | ................ | B65B 37/04 222/181.1 |

* cited by examiner

ANTI-OXIDATION BULK PRODUCT DISPENSING SYSTEM

CROSS-REFERENCE TO RELATED APPLICATIONS

This application claims priority to U.S. provisional application No. 62/027,309, filed Jul. 22, 2014, the contents of which are hereby incorporated by reference.

FIELD

The present invention relates generally to bulk product dispensing bins. In particular the invention relates to a system configured to lessen the effects of oxidation of product stored in bulk product dispensing bins by purging oxygenated ambient air from the bins with an oxygen displacement substance.

BACKGROUND

Gravity-feed bins for dispensing bulk-product inventory are used to dispense a wide variety of materials having a range of sizes and aggregate make-ups as diverse as hardware components, for example, nuts and bolts, to retail grocery food, such as pastas, cereals, nuts, coffee (either beans or ground), dried soup mixes, candies, spices, and the like. Generally, a gravity-feed bin is comprised of a hollow hopper-type reservoir enclosure having an inlet at an upper end utilized to fill the enclosure with bulk inventory, an outlet or chute at its lower end utilized to dispense the material, and a flow-control device located intermediate the upper and lower openings and controlled by a manually-actuated gate mechanism. This arrangement, in turn permits manipulation of the amount of inventory being dispensed during the interval the handle or other control device is actuated. In operation, as the inventory is being dispensed, the force of gravity causes the portion stored above in the reservoir to progressively migrate towards the lower end to replace the void left as portions of the inventory are dispensed. These types of bins generally include a downwardly angled or curving floor within the cavity that forms a slide to channel the stored inventory into a receptacle downstream from the outlet gate.

An alternate means for dispensing stored bulk inventory is to employ a bulk food dispenser generally known as a "scoop bin." As the name suggests, a scoop bin typically comprises a hollow plastic bin, often having a hinged lid that is lifted to provide the consumer access to the stored contents. A hand scoop is then employed to gather the bulk product for placement into a container. While scoop bins are effective for dispensing a wider variety of product than a gravity type dispenser, they suffer from several major disadvantages, particularly in the area of hygiene, because of the contamination that can take place in these types of dispensers. Sources of contamination include germs that may be attached to the scoop or scoop handle being transferred to the stored product during dispensing or from external debris falling into the bin cavity when the bin's lid is lifted. Lastly, since the nature of scoop bins requires their openings to be located closer to the floor for access reasons, they are generally within the reach of children and others who are not hesitant to reach into the unsecured bins with potentially unclean hands in order to extract a sample, or even play with the bin contents. In addition, scoop bins also suffer from inventory shrinkage, both from pilferage and from accidental spillage.

As can be appreciated from the foregoing discussion, gravity-feed bins offer a multitude of advantages compared to other dispensing means, such as scoop bins, including convenience, ease of use and hygiene. However, current gravity-feed bins are not well-suited for dispensing oxidation-sensitive products such as tea. Oxidation is a chemical process that results in the browning of tea leaves and the production of flavor and aroma compounds in finished teas. Controlled oxidation usually begins after tea leaves are rolled or macerated, two processes that break down the cell walls in tea leaves. Chemically speaking, oxidation occurs when the polyphenols in the cell's vacuoles and the peroxidase in the cell's peroxisomes come in contact with the polyphenol oxidase in the cell's cytoplasm. The resulting reaction converts tea catechins into theaflavins and thearubigins. Theaflavins provide tea with its briskness and bright taste as well as its yellow color, and thearubigins provide tea with depth and body and its orange-brown color.

This conversion of catechins to theaflavins and thearubigins means that the longer the oxidation period, the lower the amount of catechins present in the finished tea. Also, during oxidation chlorophylls are converted to pheophytin, a pigment that lends to the dark color of oxidized teas. Lipids, amino acids and carotenoids also degrade during oxidation to produce some of tea's flavor and aroma volatile compounds. The oxidizing processing of tea leaves is a controlled process and employs moist, oxygen-rich air over time. Controlled oxidation may be halted by removing the oxygen from the finished tea product, which renders the enzymes responsible for the reaction inoperable. Further oxidation of the finished tea product, such as during storage in an oxygenated container or while housed in dispensing containers exposed to oxygenated ambient air such as in a point of sale environment is undesirable in that it can degrade the tea's quality and flavor. There is thus a need for a system utilizing an oxygen displacement substance, such as an inert gas, to conveniently and cost-effectively flush or purge oxygenated ambient air from dispensing containers holding oxidation-sensitive bulk product.

SUMMARY

An anti-oxidation bulk product dispensing system is disclosed according to several embodiments of the present invention. One embodiment of the present invention includes a gravity-feed bin, an oxygen displacement substance, a supply source, and a control valve. A reservoir of the gravity feed bin is filled through an inlet with oxidation-sensitive bulk product such as, for example, processed tea leaves. The product is stored in the reservoir and selectively dispensed through an outlet of the bin. The bin unavoidably receives oxygenated ambient air while receiving and dispensing the product. The supply source provides the oxygen displacement substance (typically an inert gas), and is coupled to the reservoir through the control valve to selectively deliver the inert gas. A controller may periodically actuate the control valve to supply the oxygen displacement substance to the reservoir. The oxygen displacement substance displaces the oxygenated ambient air in the reservoir, thereby lessening oxidation of the stored product.

Another embodiment of the present invention includes a plurality of gravity-feed bins, an oxygen displacement substance, a supply source, a plurality of control valves, and a controller. Each of the bins includes a reservoir, an inlet and an outlet. Each of the bins are configured to receive the product through the inlet, store product in the reservoir, and to selectively dispense the product through the outlet. Each of the bins operates to inadvertently receive oxygenated ambient air while receiving and dispensing the product. The oxygen displacement substance is configured to lessen oxidation of the product. The supply source is configured to selectively provide the oxygen displacement substance to each of the bins. The plurality of control valves are in communication with the supply source. Each of the control valves is in communication with a corresponding bin and configured to selectively deliver the oxygen displacement substance to the corresponding bin. The controller is in communication with the control valves. The controller is configured to selectively control the operation of each of the control valves according to a periodic operating schedule and according to information relating to product being dispensed from the outlet. The oxygen displacement substance displaces the oxygenated ambient air in the bin, thereby lessening oxidation of the stored product.

A further embodiment of the present invention is a method for selectively displacing oxygenated ambient air in an oxidation-sensitive bulk product dispensing system. The method includes obtaining a gravity-feed bin; the bin includes a reservoir, an inlet and an outlet. The bin is configured to receive the product through the inlet, store product in the reservoir, and to selectively dispense the product through the outlet. The bin operates to inadvertently receive oxygenated ambient air while receiving and dispensing the product. The method also includes obtaining an oxygen displacement substance configured to lessen oxidation of the product. The method further includes obtaining a supply source configured to selectively dispense the oxygen displacement substance. The method also includes obtaining a control valve in communication with the supply source and the bin. The method includes selectively providing the oxygen displacement substance from the supply source to the bin and selectively actuating the control valve to deliver the oxygen displacement substance to the bin. The method also includes displacing the oxygenated ambient air in the bin with the oxygen displacement substance to lessen oxidation of the stored product.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
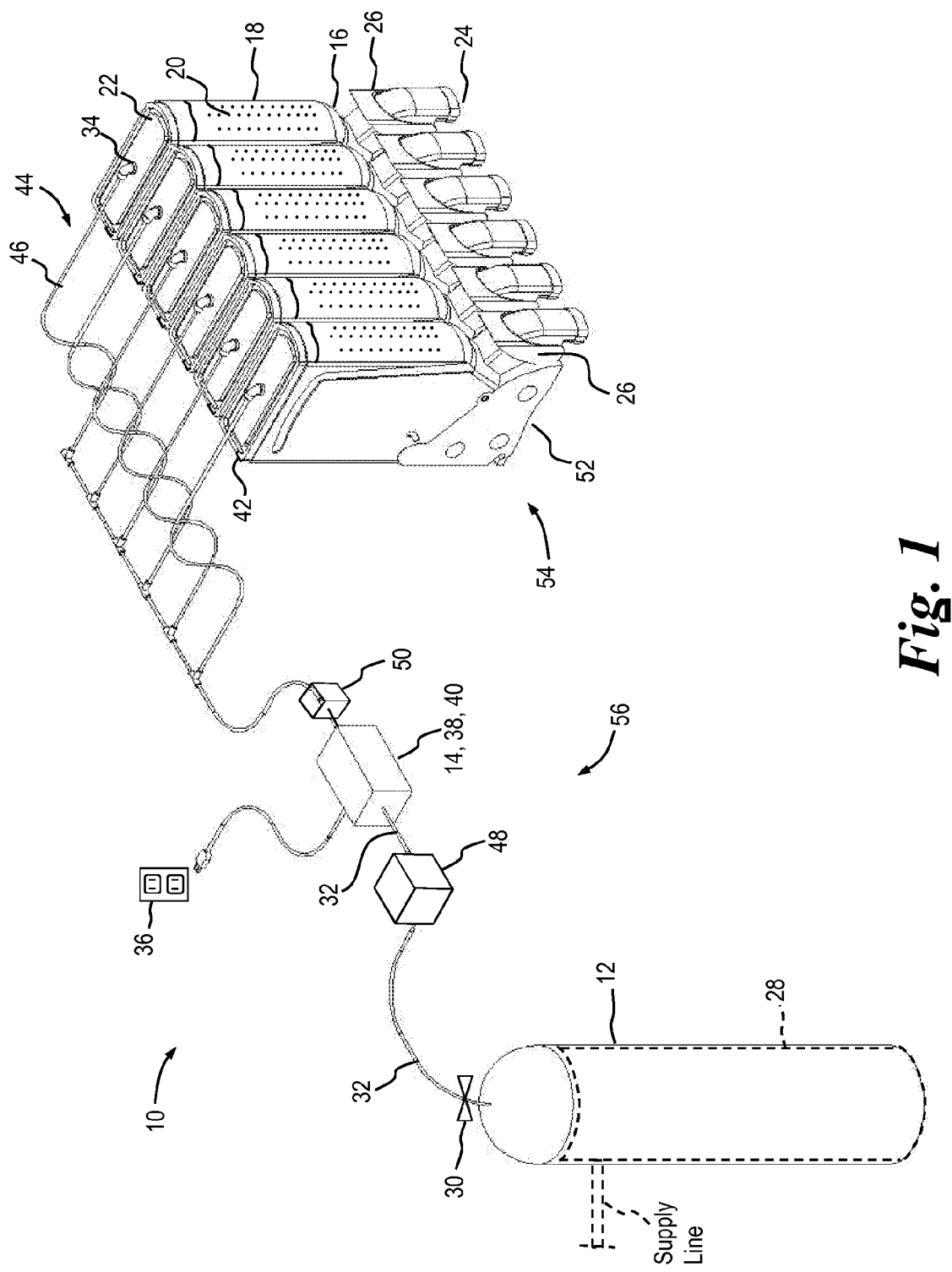
FIG. 1 is a perspective view of an anti-oxidation bulk product dispensing system according to an embodiment of the present invention.

In the discussion that follows and in the accompanying figures, like reference numerals are used to indicate components having substantially the same structure or function.

Figure 2:
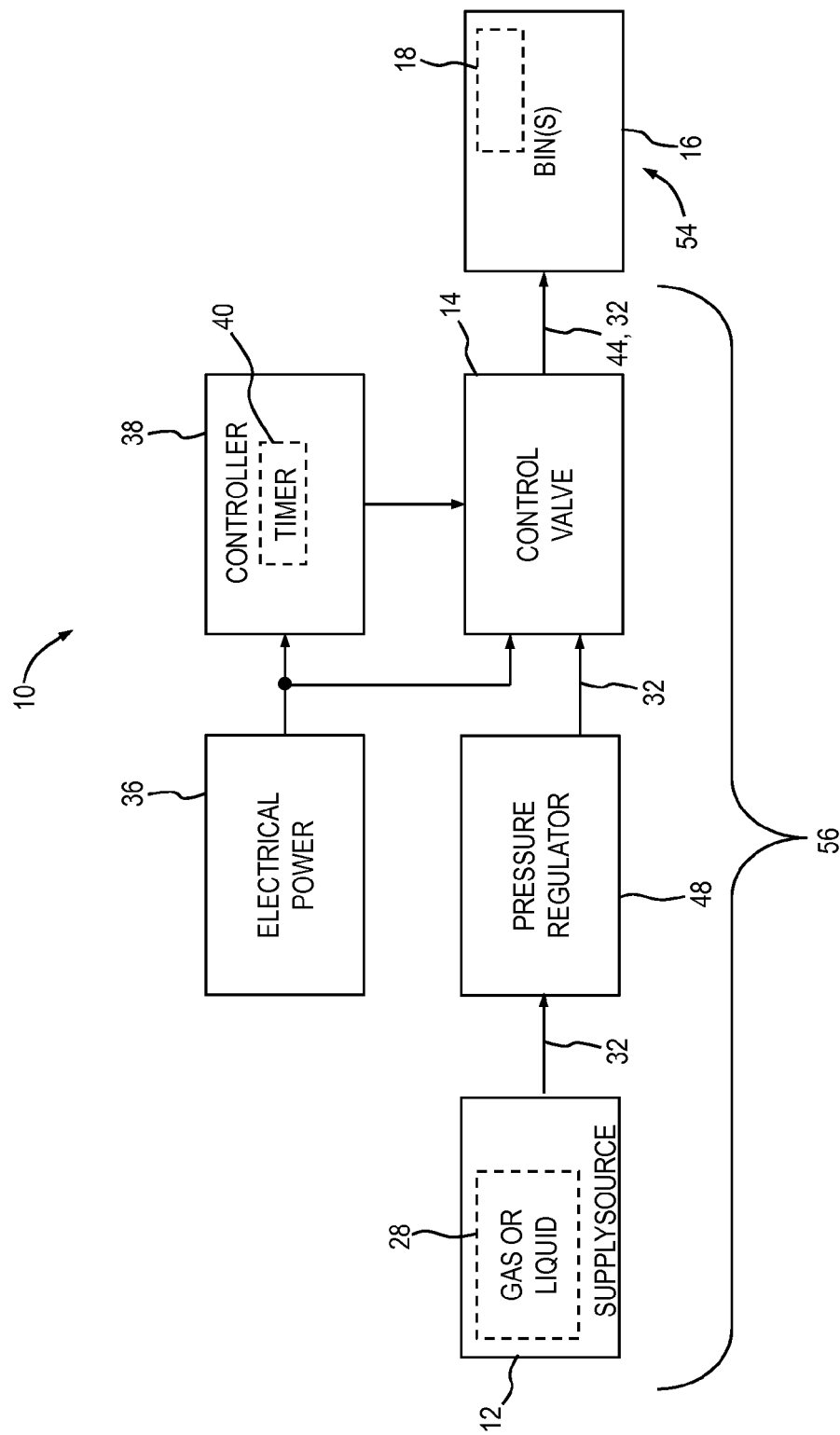
FIG. 2 is a schematic block diagram of the system of FIG. 1.

With reference to FIGS. 1 and 2, the general arrangement of an anti-oxidation bulk product dispensing system 10 is shown according to an embodiment of the present invention. System 10 includes an oxygen displacement substance (ODS) 28, a supply source 12, a control valve 14, and one or more gravity-feed bins 16. Gravity-feed bins 16 include reservoirs 18 configured to receive, store and gravity-feed an oxidation-sensitive product 20, such as tea or coffee. In operation bins 16 inadvertently receive oxygenated ambient air while receiving and dispensing product 20. Oxygenated ambient air may be re-introduced into bins 16 as product 20 is re-supplied by opening inlet covers 22 or as the product is selectively dispensed from outlet dispensing chutes 24 via operation of dispensing handles 26. Preferably, covers 22 are located at the top portion of reservoirs 18 and dispensing chutes 24 are located at the bottom portion of the reservoirs. Product 20 flows out by gravity-feed from dispensing chutes 24 once dispensing handles 26 are moved to an "open" position, and stop flowing once the dispensing handles return to a "closed" position.

Supply source 12 is configured to hold or receive the oxygen displacement substance (ODS) 28. Supply source 12 may be any suitable supply tank, container, device or supply line capable of selectively providing pressurized ODS 28 to bins 16. ODS 28 is any suitable substance configured to be non-reactive with product 20 and to lessen oxidation of the product as it displaces the oxygenated ambient air within bins 16. An example ODS 28 includes, without limitation, suitable inert gases, such as nitrogen gas (chemical symbol $N_2$) and carbon dioxide (chemical symbol $CO_2$). Supply source 12 may further include suitable ancillary equipment, such as liquid-to-gas conversion devices, filters, water traps, shut-off valve 30, pressure regulators, and pressure, flow and quantity indicators. ODS 28 is carried via suitable supply lines or tubing, such as supply lines 32. Supply lines 32 may be any suitable material compatible with pressurized inert gases, such as plastic or polymers. Supply lines 32 connect to bins 16 at inlet fittings 34 located in or proximate to covers 22.

Control valve 14 is in communication with supply source 12 and bins 16. Control valve 14 is configured to selectively deliver of ODS 28 to bins 16 and may be installed inline in supply line 32. Control valve 14 may be any suitable control valve, without limitation, such as an electric-type solenoid valve coupled to a source of electrical power 36, such as batteries or AC mains. A solenoid valve may be configured to provide simple ON-OFF flow control of ODS 28, and may include a switch (not shown) to control the source of electrical power 36.

Control valve 14 may further include an integral or separate, fixed or selectably adjustable or programmable controller 38. Controller 38 is in communication with control valve 14 and is configured to selectively control the operation of control valve 14 according to system operating parameters. System operating parameters may include predetermined duty cycles of a periodic ON portion of control valve actuation, followed by an OFF portion of de-actuation of the control valve. Controller 38 may include a timing element, such as timer 40 arranged such that control valve 14 is periodically actuated to an open state in accordance with a predetermined periodic operating schedule. The operating schedule may be an ON-OFF duty cycle, allowing ODS 28 to flow from supply source 12 into reservoir 18 of bins 16 during the ON portion of the duty cycle and closing or de-actuating the control valve during the OFF portion of the duty cycle. In some embodiments, electrical power 36 may be supplied directly to a combination control valve 14/controller 38/timer 40 which may include built-in or remote adjustability. In some embodiments, controller 38 may be physically remotely from control valve 14, and the controller and control valve may utilize electric, electronic, mechanical, or pneumatic operation, or a combination thereof.

Bins 16 are preferably configured to be generally gastight, to minimize the loss of ODS 28 from the reservoirs 18 of bins 16 and the infiltration of oxygenated ambient air. For example, bins 16 may include an arrangement of seals to deter leakage of ODS 28 and allow at least slight positive pressurization of the bins. In addition, dispensing handles 26 may be biased to a closed sealing position when product 20 is not being dispensed from dispensing chutes 24, to deter the loss of ODS 28 from the bins. A suitable one-way venting relief device such as, without limitation, check valve 42 may optionally be coupled to each of reservoirs 18 of bins 16 and configured to open and vent to the exterior when the bins are pressurized above a predetermined level. Check valves 42 may be located proximate to covers 22.

When a plurality of bins 16 are employed in system 10 a manifold 44 may be utilized to distribute a supply of ODS 28 to each bin. Preferably, manifold 44 includes a group of branch supply lines 46, each branch supply line 46 connected to a corresponding inlet fitting 34 and configured to provide ODS 28 to each bin 16 at a generally equal pressure. Each bin 16 may be flushed or purged with ODS 28 simultaneously upon actuation of control valve 14 or individually, in applications utilizing a plurality of corresponding control valves 14.

In operation of system 10, reservoirs 18 of gravity feed bins 16 are initially filled with a sufficient quantity of product 20. Supply source 12 provides or is pre-pressurized with ODS 28, and electrical power is supplied to timer 40 and control valve 14. Timer 40 periodically actuates control valve 14 in accordance with a predetermined ON-OFF duty cycle, the actuated control valve opening during the ON portion of the duty cycle to supply ODS 28 to reservoirs 18. ODS 28 displaces and purges oxygenated ambient air from reservoirs 18, thereby lessening the effects of oxidation on the stored product 20, and thus maintaining its quality and increasing its shelf life.

In some embodiments of the present invention system 10 may further include a pressure regulator 48 configured to adjust and set the pressure of ODS 28 provided by supply source 12 to a predetermined pressure level. In some embodiments pressure regulator 48 may be a combination pressure and flow regulator that is additionally configured for adjustment and indication of the volumetric flow rate of ODS 28. Alternatively, a separate flow regulator 50 may be utilized. Pressure regulator 48 and flow regulator 50 may be placed at any suitable point in system 10. For example, pressure regulator 48 and flow regulator 50 may be integrated with supply source 12, may be incorporated with controller 38, or may be positioned at any suitable point between the supply source and reservoirs 18.

In some embodiments each of the bins 16 are mounted to a base 52 and arranged adjacently to form a dispensing display 54. Dispensing display 54 may be incorporated into a publically accessible commercial shelving unit or other suitable structural support system (not shown). The remaining portion of the bulk product dispensing system 10 such as the supply source 12, control valve 14, controller 38 and associated supply lines 32 form together a displacement system 56. Preferably, the displacement system 56 may be incorporated into a publically non-accessible portion of the commercial shelving unit or structural support system, or into a publically non-accessible location proximate to the dispensing display 54. Portions of displacement system 56 may alternatively be incorporated into publically non-accessible portions of bins 16, bases 52 or dispensing display 54.

Figure 3:
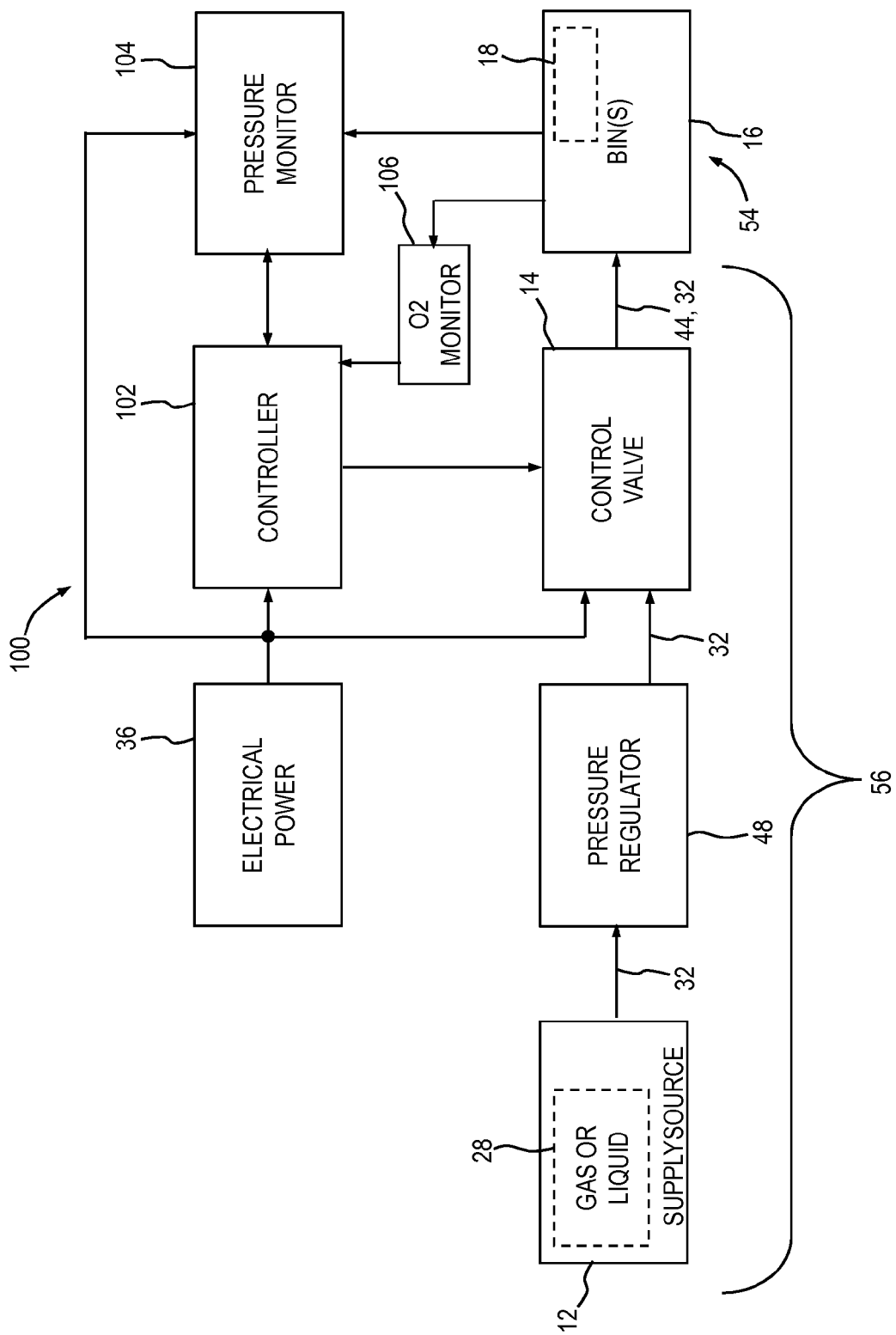
FIG. 3 is a schematic block diagram of an anti-oxidation bulk product dispensing system according to another embodiment of the present invention.

With reference to FIG. 3, the general arrangement of an anti-oxidation bulk product dispensing system 100 is shown according to another embodiment of the present invention. In this system a controller 102 may be configured to analyze pressure measurement information from a pressure monitor 104. Controller 102 may be further configured to actuate control valve 14 to an open state when the pressure measured in reservoirs 18 by pressure monitor 104 falls below a first predetermined level, and de-actuate (i.e., close) the valve when the pressure in the reservoirs rises to a second predetermined level. In this embodiment, system 100 functions to maintain ODS 28 within reservoirs 18 of bins 16 within a predetermined pressure range.

In some embodiments, controller 102 may be configured to analyze oxygen level measurement information from an oxygen monitor 106. Controller 102 may actuate control valve 14 when the oxygen level in the reservoirs rises to a first pre-determined level, and de-actuate the valve when the oxygen level in the reservoirs falls back below a second predetermined level. In this embodiment, system 100 functions to control ODS 28 to maintain a predetermined oxygen level range within reservoirs 18 of bins 16.

Figure 4:
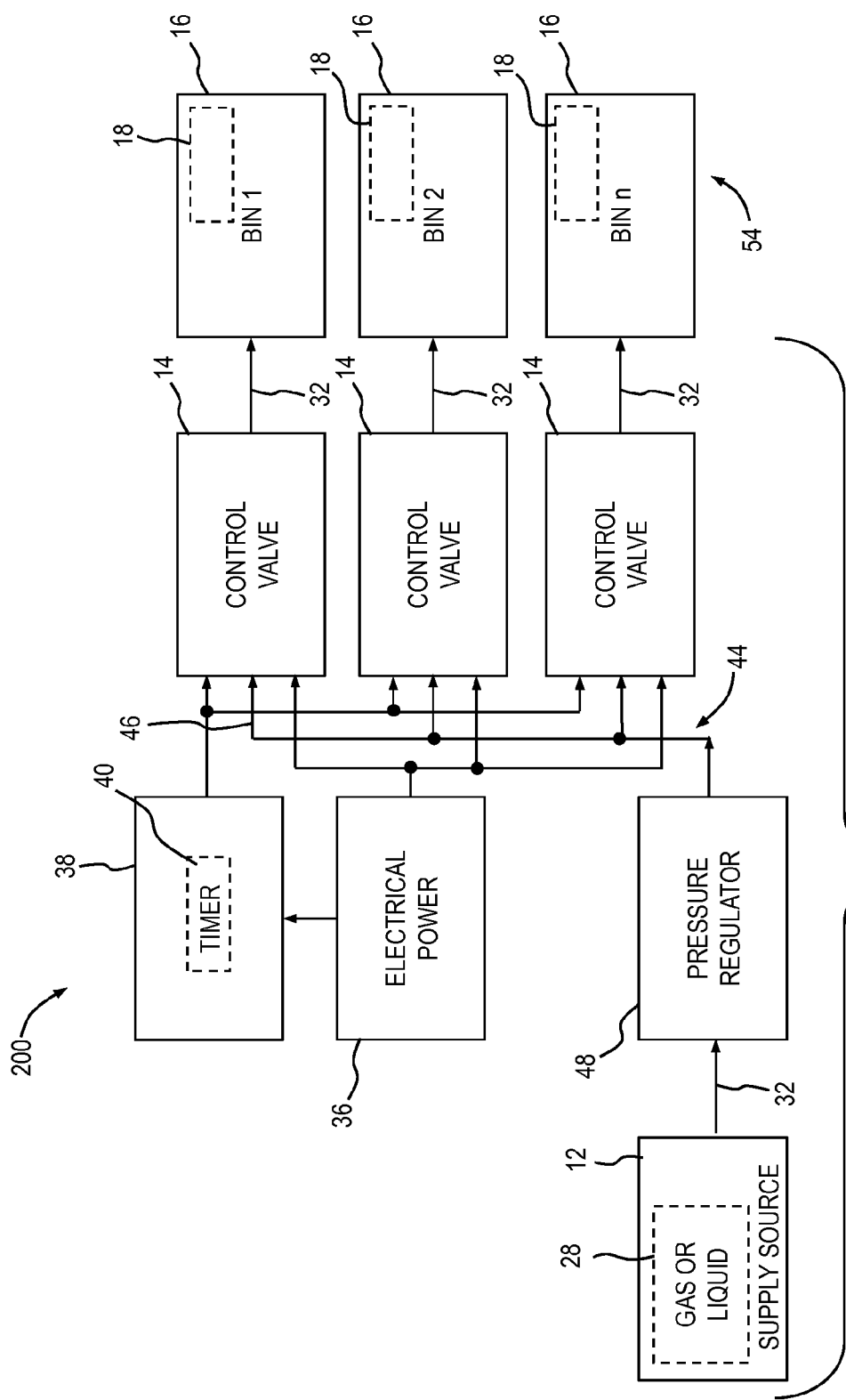
FIG. 4 is a schematic block diagram of an anti-oxidation bulk product dispensing system according to yet another embodiment of the present invention.

With reference to FIG. 4, the general arrangement of an anti-oxidation bulk product dispensing system 200 is shown according to yet another embodiment of the present invention. System 200 includes a plurality of control valves 14, each control valve being coupled to a corresponding bin 16. A timer 40 of controller 38 may control operation of the control valves 14 in the manner previously described. Alternatively, a plurality of timers 40 may be utilized such that each control valve 14 is individually controlled by a corresponding timer 40 in the manner described above.

Figure 5:
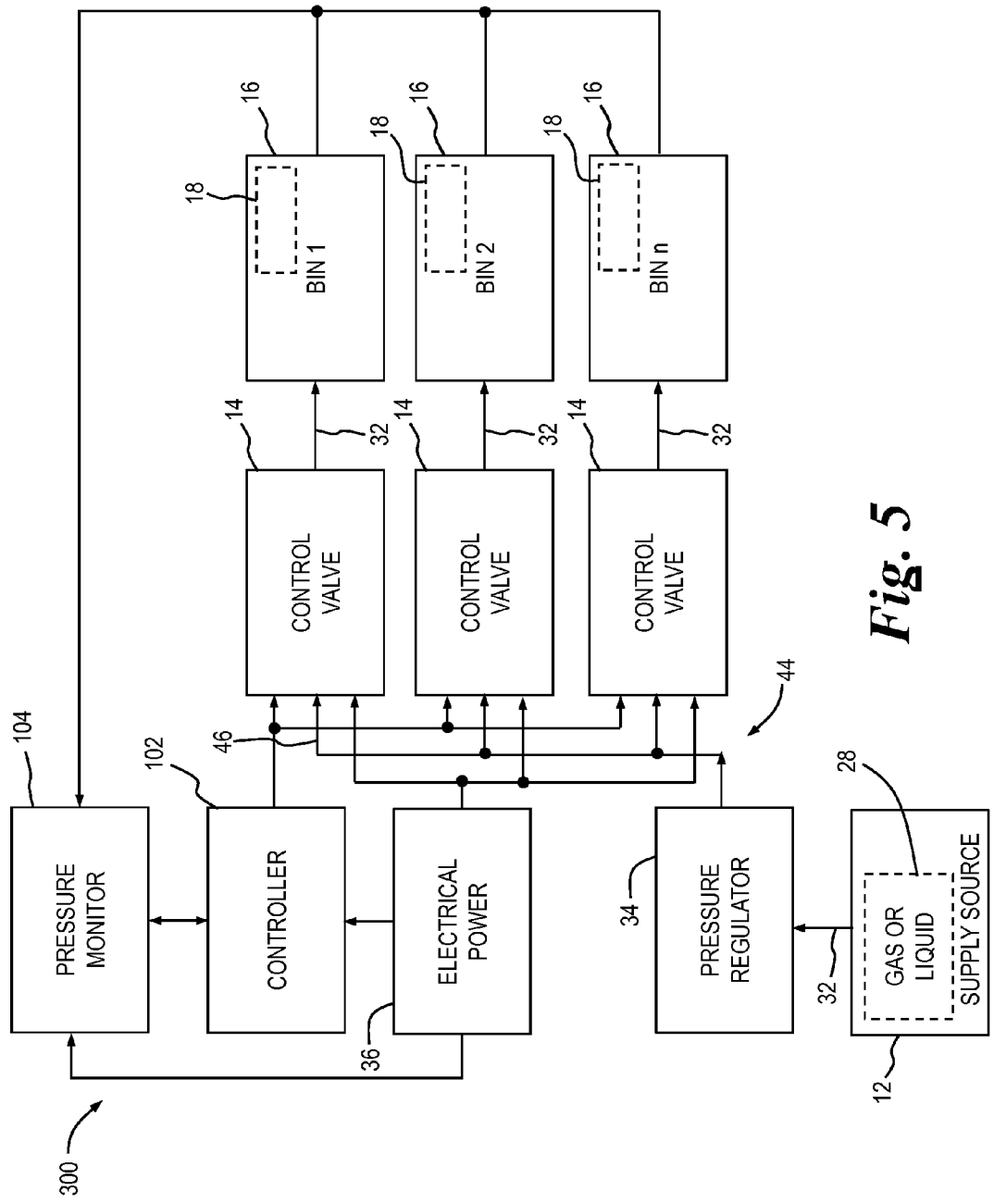
FIG. 5 is a schematic block diagram of an anti-oxidation bulk product dispensing system according to still another embodiment of the present invention.

With reference to FIG. 5, the general arrangement of an anti-oxidation bulk product dispensing system 300 is shown in according to still another embodiment of the present invention. System 300 includes a plurality of control valves 14, each control valve being coupled to a corresponding bin 16. In some embodiments, control valve 14 may be directed connected or integral with bin 16. A controller 102 and pressure monitor 104 controls operation of the control valves 14 in the manner previously described to maintain a predetermined pressure range within an aggregation of reservoirs 18 of bins 16.

In one alternative embodiment of system 300 a plurality of pressure monitors 104 may be coupled to a controller 102. In a further alternative, pressure monitor 104 may itself be configured to monitor the pressures of each individual reservoir 18 and provide this information to controller 102. Controller 102 analyzes the pressure of each individual reservoir 18 and individually controls the operation of the control valves 14 as required to separately maintain a predetermined pressure range (or ranges) within each of the reservoirs 18 of bins 16. In yet another alternative embodiment of system 300 a separate control valve 14, controller 102 and pressure monitor 104 may be coupled to each reservoir 18.

Figure 6:
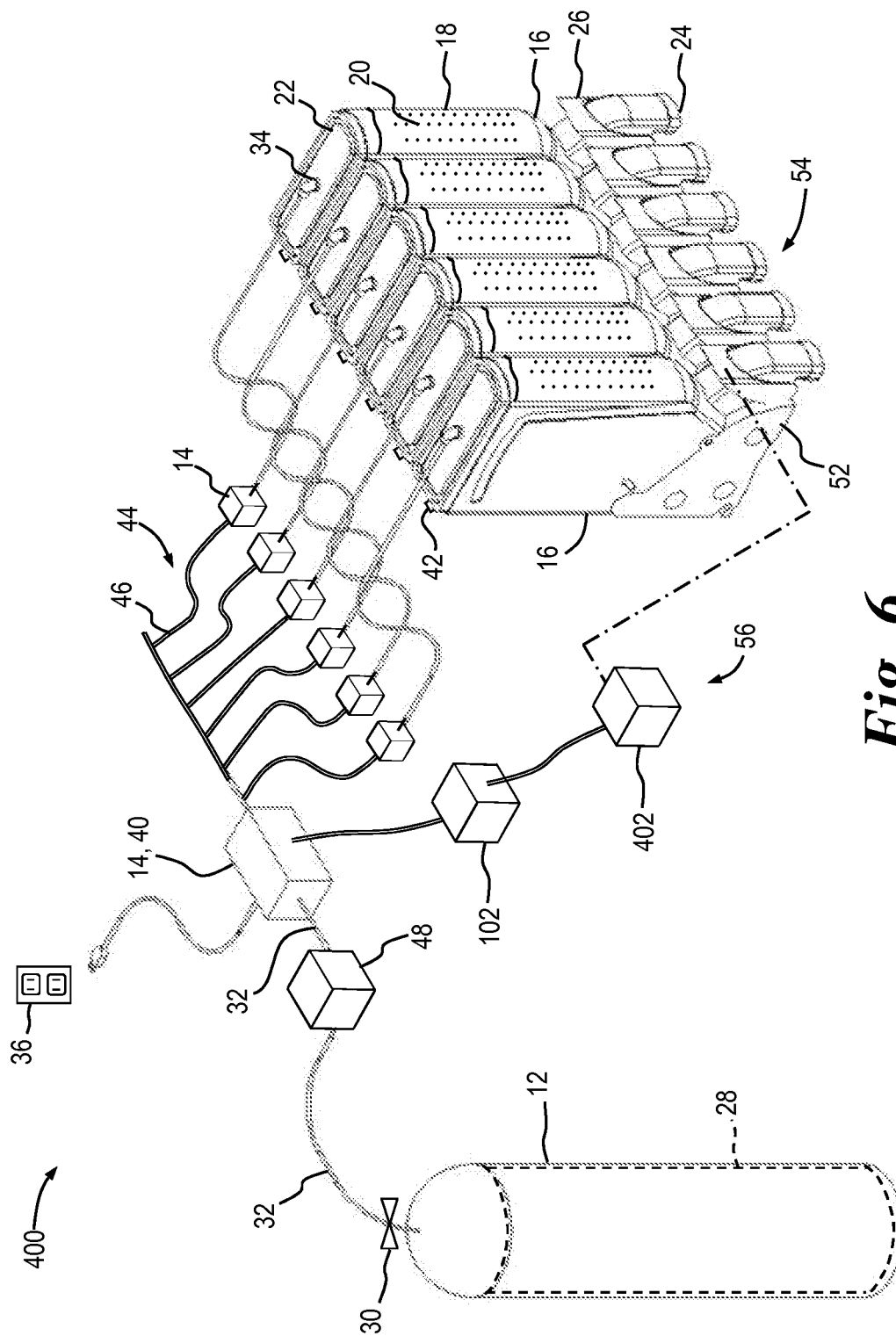
FIG. 6 a perspective view of an anti-oxidation bulk product dispensing system according to yet another embodiment of the present invention.
Figure 7:
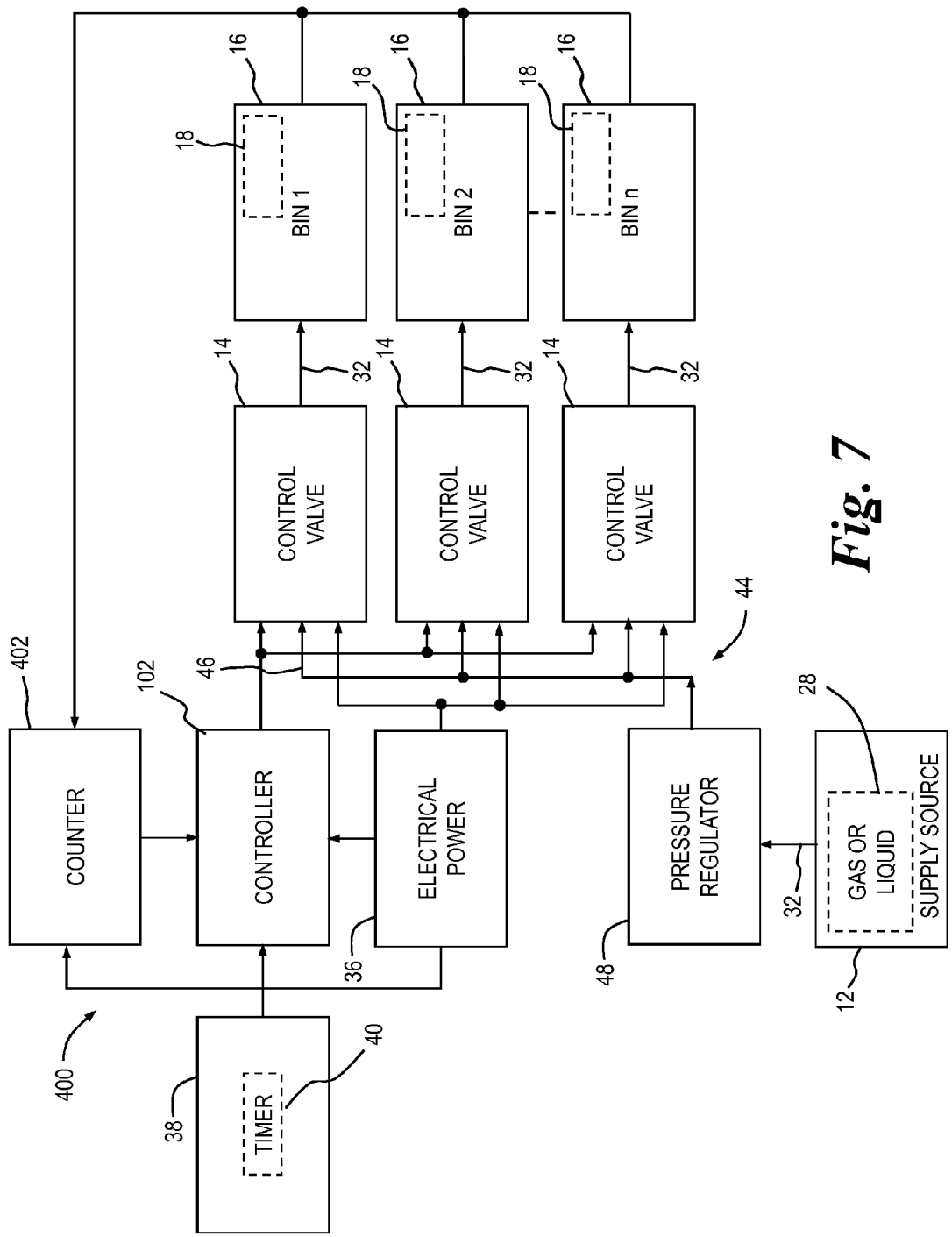
FIG. 7 is a schematic block diagram of the anti-oxidation bulk product dispensing system of FIG. 6.

With reference to FIGS. 6 and 7, the general arrangement of an anti-oxidation bulk product dispensing system 400 is shown according to still another embodiment of the present invention. System 400 includes a counter 402 in communication with the dispensing handles 26. Counter 402 provides usage information to a controller 102 such that the controller actuates (i.e., opens) a corresponding control valve 14 after a predetermined number of actuations of dispensing handles 26. In some embodiments counter 402 operates in conjunction with a timer 40 such that the counter actuates control valve 14 regardless of the state of the ON-OFF duty cycle of the timer when a predetermined number of actuations of dispensing handles 26 have been counted. In this manner ODS 28 can be maintained in bins 16 that are used with high or varying frequency.

Counter 402 may be any type of electrical, electronic, mechanical, optical, or electro-mechanical device configured to detect actuation of dispensing handles 26 of one or more bins 16 and generate a corresponding count signal that is readable by controller 102. Counter 402 and/or controller 102 may be incorporated into publically non-accessible portions of bin 16, base 52 or dispensing display 54.

A single counter 402 is shown in FIGS. 6 and 7 for clarity. However, it is understood that a plurality of counters 402 may be utilized, each counter being individually coupled to a corresponding dispensing handle 26 of a bin 16. A plurality of control valves 14 are shown in FIGS. 6 and 7, each control valve being individually coupled to a corresponding bin 16, but a single control valve may be utilized. A single controller 102 may be utilized as shown, or a plurality of controllers 102 may be utilized, each controller being coupled to a corresponding counter 402 and control valve 14.

In some arrangements each bin 16 of system 400 is individually supplied with ODS 28 and individually re-supplied with ODS by an individual control valve 14 after a predetermined number of actuations of the dispensing handle 26 of the associated bin. Alternatively, either or both of control valve(s) 14 and counter(s) 402 may be coupled to a plurality of bins 16. Similarly, one or more controllers 102 may be operatively coupled to one or more control valves 14 and counters 402.

Figure 8:
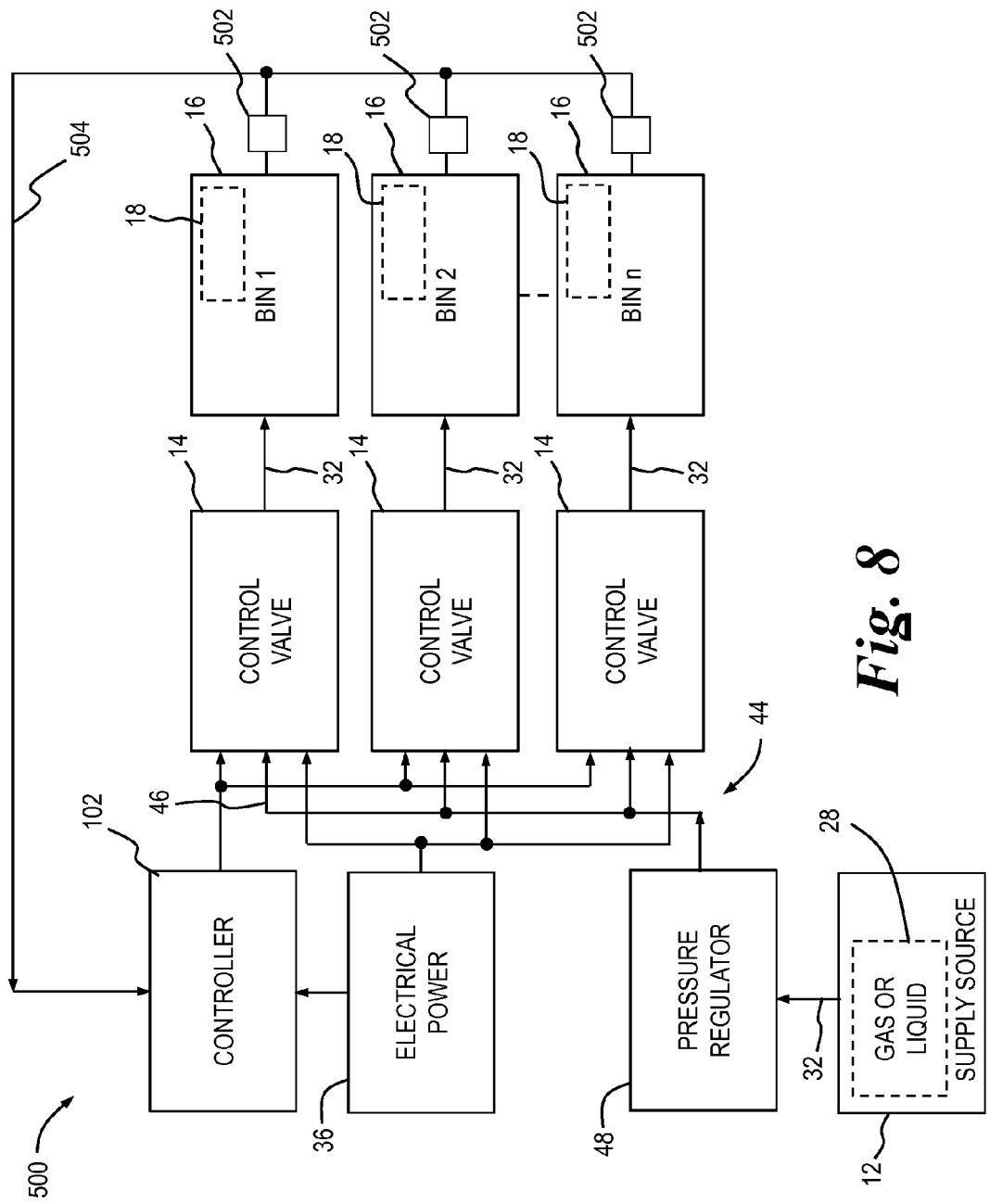
FIG. 8 is a schematic block diagram of the anti-oxidation bulk product dispensing system according to a further embodiment of the present invention.

With reference to FIG. 8, the general arrangement of an anti-oxidation bulk product dispensing system 500 is shown according to still another embodiment of the present invention. System 500 includes a plurality of sensors 502 to detect the change of state of exposure to oxygenated ambient air caused by the opening and closing of bins 16. Sensors 502 may detect opening and closing of covers 22 during filling of the bins with product 20 and/or operation of dispensing handles 26. Sensors 502 may be any suitable sensor, without limitation, such as optical sensors, and are configured to communicate a status signal 504 to controller 102. Status signal 504 includes information linked to the corresponding bin 16. Controller 102 analyzes the status of each individual bin 16 and individually controls the operation of the control valves 14 as needed to deliver ODS 28 to each of the reservoirs 18 of bins 16.

Figure 9:
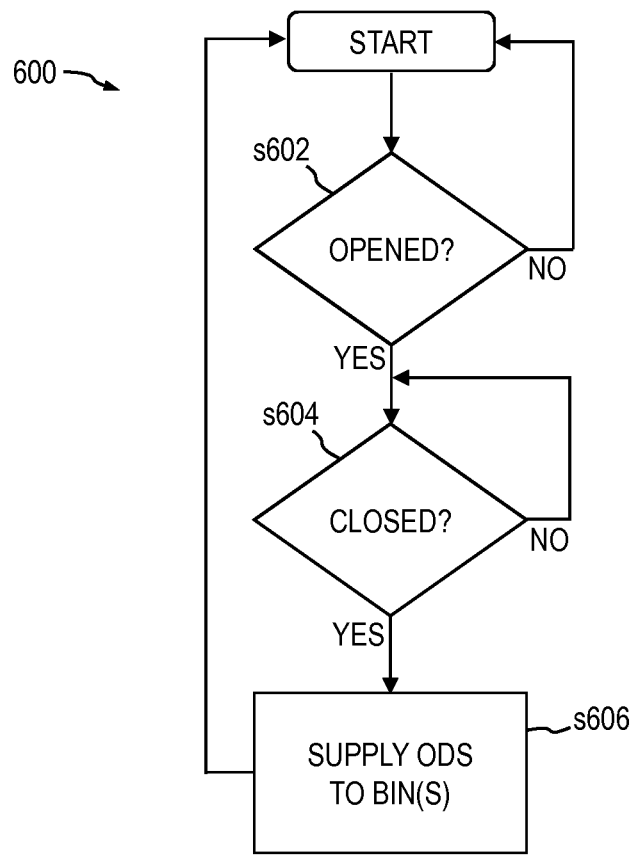
FIG. 9 is a flow diagram of a sequence of operation of the anti-oxidation bulk product dispensing system of FIG. 8.

With reference to FIG. 9, a flow diagram of a sequence of operation 600 of system 500 is shown according to yet another embodiment of the present invention. At s602 sensors 502 monitor for operation or position of dispensing handle 26 or other similar actuation or change of state indicating that the associated bin 16 has been operated, e.g., "opened" to dispense product therefrom. Sensors 502 may also monitor for the position of covers 22 as "opened". Sensors 502 communicate status signal 504 linked to the corresponding bin as indicating "open" to controller 102. At s604 sensors 502 monitor for an indication of completion of the dispensing operation, e.g., that bin 16 has been "closed," such as by monitoring the position of dispensing handles 26 or an associated door of the bin. Sensors 502 communicate status signal 504 linked to the corresponding bin as indicating "closed" to controller 102.

Once controller 102 detects closure of the bin 16, it actuates the corresponding control valve 14. At s606 the control valve 14 delivers ODS 28 to the bin, either as a predetermined quantity or as a closed-loop pressure measurement as detailed above. The delivery of ODS 28 at s606 may optionally be interrupted or halted if the bin 16 is opened while ODS is being supplied. The supply of ODS 28 may resume once the bin 16 is again closed, or the supply may be terminated and sequence of operation 600 resets to s602. At the completion of s606 the sequence of operation 600 resets to s602.

Individual bins 16 of system 500 may be configured in the manner described above, for independent monitoring and supply of ODS 28. Alternatively, a group of bins 16 may be supplied with ODS 28 when one or more of them are operated.

With reference again to FIGS. 1, 2, 4, 6 and 7, in some embodiments of the present invention timer 40 may be configured with an ON-OFF duty cycle corresponding to certain operating characteristics of a commercial establishment in which the aforementioned timer-based anti-oxidation bulk-product dispensing systems are installed. As a non-limiting example, the timer-based systems may be installed in a supermarket that is open for business (occupied cycle) during certain hours and is otherwise closed (unoccupied cycle). Timer 40 may accordingly be configured with an ON-OFF duty cycle such that control valve 14 is actuated at least once after the supermarket has closed (during the unoccupied cycle). Timer 40 may likewise be configured with an ON-OFF duty cycle to actuate control valve 14 at least once during the hours the supermarket is open for business (during the occupied cycle).

Similarly, timer 40 may be configured with a regular ON-OFF duty cycle. Example regular ON-OFF duty cycle periods may include, without limitation, actuation of control valve 14 every 4, 6, 8 or 12 hours. Such an arrangement may be preferable for commercial establishments that do not normally close, such as 24-hour supermarkets.

A further refinement of the present invention includes selecting ON-OFF duty cycles with longer or shorter periods of OFF time between actuations of control valve 14 and corresponding to typical customer traffic or bin-usage patterns for the commercial establishment. The period of ON time for actuating control valve 14 may be similarly tailored.

Various features and elements of the anti-oxidation bulk product dispensing systems 10, 100, 200, 300, 400 and 500 may be combined in further alternative embodiments.

While this invention has been shown and described with respect to detailed embodiments thereof, it will be understood by those skilled in the art that changes in form and detail thereof may be made without departing from the scope of the claims of the invention.

What is claimed is:

1. An anti-oxidation bulk product dispensing system for oxidation-sensitive bulk product, comprising:
   a plurality of gravity-feed bins, each of the bins including:
   a reservoir, an inlet and an outlet, the bins configured to receive the product through the inlet of each of the bins, store product in the reservoirs, and to selectively dispense the product through the outlet of each of the bins, the bins operating to inadvertently receive oxygenated ambient air while receiving and dispensing the product;

an oxygen displacement substance configured to lessen oxidation of the product;

a supply source configured to selectively provide the oxygen displacement substance to the bins;

each of the bins being configured to be in communication with the supply source via a branch supply line, branch supply lines of the bins forming a supply manifold;

a plurality of control valves, each of the control valves being in communication with the supply source and a corresponding bin, each of the control valves being configured to selectively deliver the oxygen displacement substance to the corresponding bin;

a counter in communication with a plurality of dispensing handles of the bins, the counter configured to receive usage information relating to a number of actuations of each of the dispensing handles; and a controller configured to receive and analyze the usage information, the controller further configured to actuate a corresponding control valve to deliver the oxygen displacement substance to a corresponding bin when a predetermined number of actuations of a corresponding dispensing handle has been counted;

whereby the oxygen displacement substance displaces the oxygenated ambient air in the bins, thereby lessening oxidation of the stored product.

\* \* \* \* \*